United States Patent [19]

Dereng

[11] 3,799,480
[45] Mar. 26, 1974

[54] PARACHUTE DEPLOYMENT BAG

[76] Inventor: Viggo G. Dereng, 702 Juniper Dr., Newport News, Va. 23601

[22] Filed: Aug. 23, 1972

[21] Appl. No.: 283,138

[52] U.S. Cl. .............................................. 244/147
[51] Int. Cl. ........................................... B64d 17/40
[58] Field of Search ............ 244/147, 148, 138, 139

[56] References Cited
UNITED STATES PATENTS
2,762,589   9/1956   Frieder et al. ...................... 244/148
3,188,027   6/1965   Sepp .................................. 244/147

*Primary Examiner*—Duane A. Reger
*Assistant Examiner*—Charles E. Frankfort
*Attorney, Agent, or Firm*—Howard J. Osborn; Wallace J. Nelson; John R. Manning

[57] ABSTRACT

A parachute deployment bag has a top wall portion closing the top end of the bag, a bottom wall portion closing the bottom end of the bag, and a side wall portion extending between the top and bottom wall portions. The side wall portion includes a foraminous outer wall and an inner wall made up of a plurality of segments. Each segment has a low friction inner surface, such as Teflon, and is secured at one edge only to the outer wall. Thus, each segment is a flap and, on removal of a parachute from an end of the bag, the flap segments flex or fold to admit ambient atmosphere through the foraminous outer wall to facilitate removal of the parachute. One edge of each flap segment overlaps, shingle fashion, the secured edge of each lower segment to form a continuous wall, sealed by the pressure exerted outward by the packed canopy. As the canopy is deployed, the flaps will successfully flex or fold open allowing entrance of ambient atmosphere.

11 Claims, 2 Drawing Figures

PARACHUTE DEPLOYMENT BAG

The invention described herein was made by an employee of the United States Government and may be manufactured and used by or for the Government for governmental purposes without the payment of any royalties thereon or therefor.

BACKGROUND OF THE INVENTION

This invention relates to a parachute deployment bag.

A parachute deployment bag is one which is used to deploy the parachute canopy in a position to be opened. The parachute cords are secured to an object, such as an airplane, rocket, missile, or the like, which is to be delivered to the planetary surface intact, and to the canopy which is stored in the parachute deployment bag. The parachute to which the invention relates is conventional and includes one or more canopies, suspension or riser lines, and riser straps secureable to the object.

The parachute may be deployed in any conventional manner including mortar deployment and drogue deployment. An example of a mortar deployment system which may be used is disclosed in co-pending application Ser. No. 108,824, filed Jan. 22, 1971, by James E. Pleasants and Viggo G. Dereng, now U.S. Pat. No. 3,700,192, issued Oct. 24, 1972. Deployment may also be of the canopy first type or the lines first type. For example, in lines first mortar deployment, the bag is discharged from the object for deployment and this may be effected manually or mechanically as the bag assumes its deployed position, drag on the cords pulls the parachute canopy from the deployment bag. The bottom end of the bag, that is, the end through which the parachute canopy is removed is provided with a rupturable closure, such as rupturable stitching or the like, which is ruptured in any known manner such as by the forces exerted by drag or by rocket or the like used to deploy the canopy.

Two general types of parachute deployment bags are in general use. In the first, intact bag, type, the main portion of the bag maintains its integrity throughout the entire deployment sequence. In the second, split bag, type, the main portion of the bag maintains its integrity only through the suspension line deployment and, at the time of canopy deployment, the main portion of the bag is ripped down the side at two or more predetermined points allowing the canopy to spill into the atmosphere. The intact bag suffers from several problems occasioned by a pressure differential across the bag wall during high speed deployment of the canopy. In general, the speed of deployment of the canopy through the open end of the bag is rapidly reduced due to the "bellows effect" or pressure differential created across the bag wall caused by rapid removal of the canopy from the bag. The same pressure differential exerts a squeeze on the deploying canopy which may cause degeneration of the canopy cloth due to the heat of friction. While the split bag type avoids these problems, it dumps the furled canopy into a highly turbulent atmosphere which creates a high possibility of being twisted or entangled thereby raising the likelihood of damage due to friction or strain and causing indeterminate expansion characteristics. Also, canopy dumping exposes a much larger area to the atmosphere with a relative increase, in drag, and initial deployment energy requirement.

It is an object of the present invention to provide a new parachute deployment bag. It is a further object to provide a parachute deployment bag which overcomes the problems which inhere in the use of the intact bag and split bag types mentioned above.

BRIEF SUMMARY OF THE INVENTION

The foregoing and other objects which will be apparent to those of ordinary skill in the art are achieved according to the present invention by providing a parachute deployment bag comprising a top wall portion closing the top end of the bag, a bottom wall portion closing the bottom end of the bag, and a side wall portion extending between the top wall portion and the bottom wall portion, the improvement wherein the side wall portion comprises a foraminous outer wall and an inner wall, the inner wall being made up of a plurality of segments, each segment having an upper end disposed towards the top end of the bag and a lower end disposed towards the bottom end of the bag and having a low friction inner surface and being secured at one end only to the outer wall whereby, on removal of a parachute canopy from the bottom end of the bag, segments of the inner wall above the removed canopy flex to admit ambient atmosphere through the foraminous outer wall to facilitate removal of the parachute canopy, the free end of each segment overlapping the secured end of each adjacent segment.

DETAILED DESCRIPTION

There follows a detailed description of a preferred embodiment of the invention, together with accompanying drawings. However, it is to be understood that the detailed description and accompanying drawings are provided solely for the purpose of illustrating a preferred embodiment and that the invention is capable of numerous modifications and variations that will be readily apparent to those skilled in the art without departing from the spirit and scope of the invention.

Figure 1:
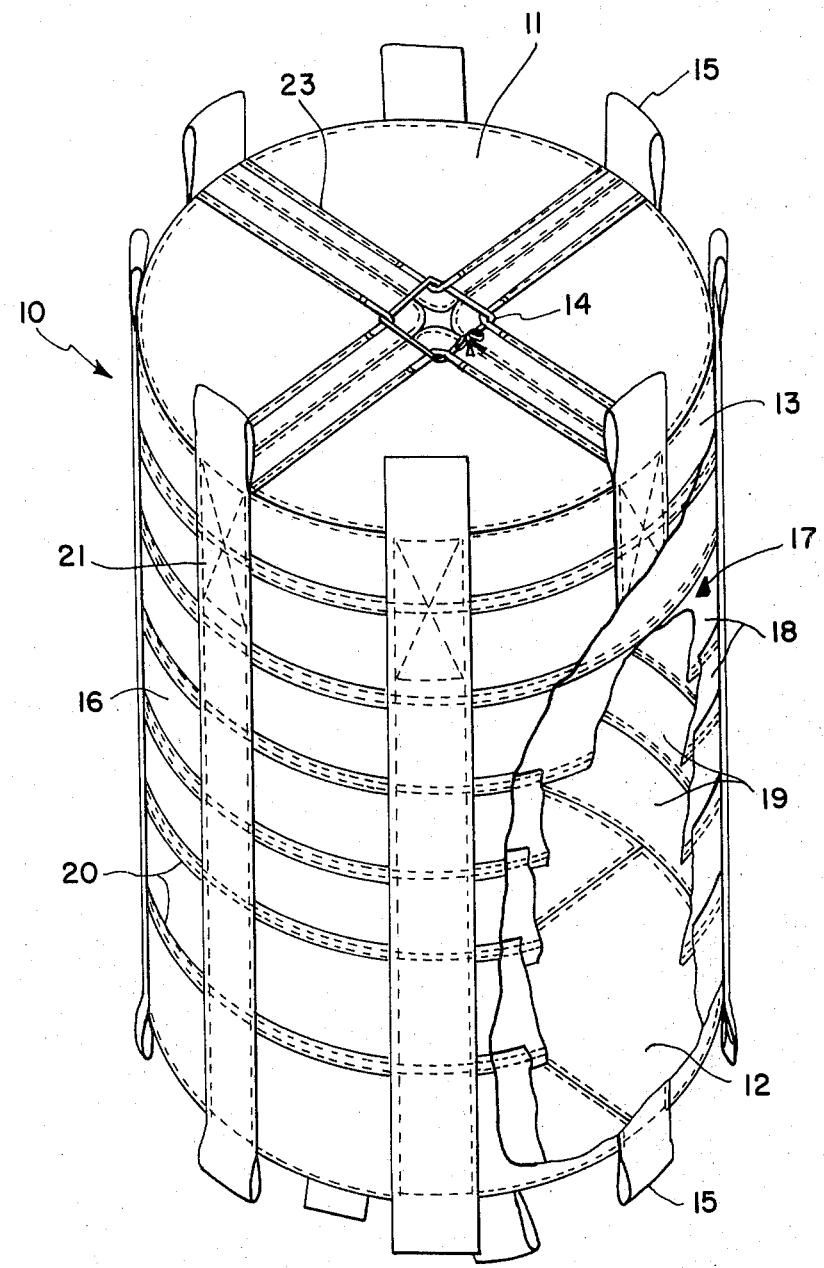
FIG. 1 is a diagrammatic perspective view, partially broken away, of a parachute deployment bag according to the present invention.

A parachute deployment bag 10 according to the present invention comprises a top wall portion 11 closing the top end of the bag, a bottom wall portion 12 closing the bottom end of the bag and a side wall portion 13 extending between the top wall portion and side wall portion. The term "top" end, as used herein, means the end of the bag remote from the object to which the deployed parachute bag is attached. This is sometimes referred to as the "head" end of the bag. It will be understood that the term "top" is thus used in a sense to distinguish one portion of the bag from another and not in an absolute sense. Similarly, the "bottom" end, as that terminology is used herein, means the end of the bag through which the parachute is removed, that is, the end closest to the object to which the deployed parachute bag is attached. The "side" portion of the bag is that portion extending between the ends of the bag and that term is thus also used in a relative, and not absolute, sense.

A typical form of bag is cylindrical as shown in the drawing with ends 11 and 12 circular. However, the bag may be made in any convenient shape. A parachute canopy of any desirable type is positioned in the container in the conventional way and the canopy has not been shown in the drawing for simplicity.

The top and bottom ends of the bag include a multiple of pie-shaped segments of substantially equal size and are closed, in any convenient manner. Normally, one end is closed prior to packing the canopy and the other end closed after packing. In the illustrated embodiment, top end is closed after packing and the segments are secured in their closed position by reinforcing tie bands 23 closed with a suitable tie string 14. The bottom end 12 is closed in a similar fashion prior to packing except that means are provided to cut tie string 14 for deployment of the parachute canopy. In the illustrated embodiment, a hooked cutting blade (not shown) secured to riser strap 15 is looped over tie string 14 such that when bag 10 is deployed, the deploying forces cause the bag to be urged away from riser strap 15 whereupon the knife blade severs string 14 opening bottom end 12 for the deployment of the canopy.

Side portion 13 includes a foraminous outer wall 16 and an inner wall 17 made up of a plurality of flap-like segments 18. The outer wall is preferably textile fabric and may conveniently be the same textile fabric used for the top and bottom ends of the bag. Any conventional porous fabric appropriate for parachute deployment bags may be used.

The segmented inner wall 17 includes a plurality of segments 18, each of which is secured by stitching at one end only to outer wall 16. Thus, each segment is a flap, hinged at ends and secured at either its upper end (i.e., its end toward the top end 11 of bag 10) or at its lower end (i.e., the end toward bottom end 12 of bag 10), the other end being free. The segments 18 are also not secured to outer wall 17 at points intermediate their upper and lower ends and thus are movable hingeably inside outer wall 16 about the end secured to outer wall 17. In the embodiment shown in FIG. 1, the segments extend circularly around the bag. It will be understood that the segments need not extend completely about the periphery of the bag. However, it is preferred that inner wall 17 is continuous about the bag periphery and thus, if a given segment does not extend completely about the bag periphery, several segments are provided in side-by-side adjacency and it is preferred that the adjacent side edges are overlapped or joined together to provide the inner wall completely around the bag periphery.

The inner surface 19 of each individual segment 18 is a low friction surface. In a preferred embodiment, inner surface 19 of segment 18 includes a synthetic resin having a low sliding friction such as Teflon. Fabric coated with a synthetic resin such as Teflon is a preferred material for segments 18.

Segments of this material may be easily stitched to the outer wall fabric by conventional methods, and after cutting to size as required, the thus-assembled side wall material may be stitched to top and bottom end fabric and the whole stitched together into a form ready for insertion of the parachute canopy. In view of the flap-like nature of segments 18, the canopy is preferably inserted from the end most nearly adjacent to the stitched ends of the skirts and closed after placing the furled canopy, lines, straps, etc., (when so packed) in the bag.

The bag is preferably reinforced by peripheral fabric bands 20 and axial fabric bands 21 secured to outer wall 16 in any convenient manner such as by stitching. Attachment loops are preferably provided as shown at the upper and lower ends of the bag. This makes possible a wide variety of applications for a given bag including inversion of the venting flaps from the position shown in the illustrated embodiment such that canopy removal folds each successive flap over thus causing positive venting. Moreover, lines first deployment is possible where the bag preceeds the parachute system from the payload and canopy first deployment is possible where the bag is attached to the payload and the canopy preceeds the lines in deployment.

Bands 20 are preferably stitched to wall 16 at the same time that segments 18 are stitched to wall 16, the stitches extending through the upper ends of segments 18, outer wall 16, and reinforcing bands 20.

The deployment bag according to the present invention avoids the problems mentioned above. First, since the bag is not of the split bag type, the problems of dumping are avoided. Second, due to the specific structure of inner wall 17, the problems of the intact bag type are minimized. The flap type arrangement of segments 18 permits ambient atmosphere to easily enter the bag in the area from which the parachute is removed. This minimizes the "bellows effect" which permits more rapid removal of the canopy with consequently less possibility of damage due to the "squeeze" effect. These results are indicated in several tests of a model parachute.

Figure 2:
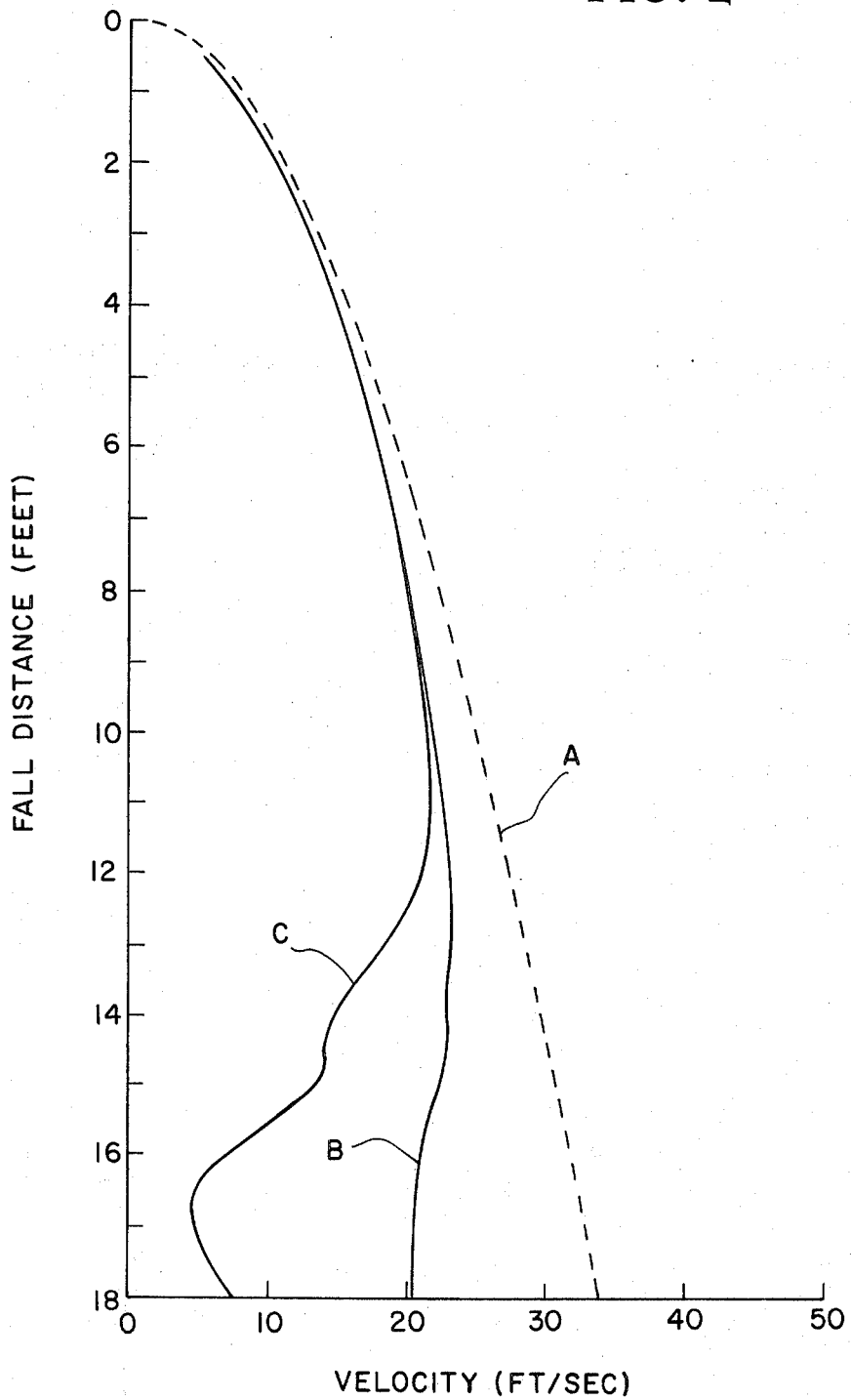
FIG. 2 is a series of curves showing the relationship of bag velocity to theoretical free fall velocity for a deployment bag according to the present invention and for an otherwise identical but non-vented bag.

Typical test data is shown graphically in FIG. 2 which includes three curves showing bag velocity as a function of distance from the drop platform. Curve A represents theoretical free fall velocity. Curve B represents actual bag velocity of a model bag according to the invention as described above. Curve C represents actual bag velocity of a non-vented bag otherwise identical to the bag of Curve B, non-venting being accomplished by enclosing the bag head and sides in 0.5 mil plastic film. As indicated in FIG. 2, velocity of the bag according to the present invention is much closer to theoretical free fall velocity thus illustrating less impedance to rapid removal of the canopy. The test also shows that it takes considerably longer to remove the canopy from the non-vented bag.

As mentioned above, various deployment systems may be used. In mortar deployment, with lines deployed first, the bag attachment lines, canopy, suspension lines, and a portion of the bridle straps are packed within the bag. The bag closure cutter is passed over the bag closure line and the bag sealed. The remainder of the bridle is passed over the sabot and the bag. This entire group is placed sabot first into the mortar tube and the cover is now attached to the mortar tube sealing the assembly. Deployment is initiated by the release of gases, generated and/or stored in the breech, through an orifice or valve into the mortar tube, creating such force as to accelerate the sabot and packed bag shearing cover attachment pins and allowing the entire assembly to be ejected away from the payload at such velocity as to cut the bag closure line allowing the bridle straps, suspension lines, canopy, and finally the bag attachment lines to deploy in sequence behind the payload. The canopy now inflates due to aerodynamic forces and sabot is thrown aside by the tightening lines.

The canopy may also be deployed by a conventional drogue. For lines first deployment, bag attachment lines, and canopy are packed in the bag. An internal flap similar to the bag ends closures is closed with cutter attached and suspension lines are folded and stored in elastic loops attached to this inner closure. (The pattern of loops will vary and multiple closures may be necessary to accommodate all of the suspension lines.) Finally, the bag closure is closed over the lines as in mortar packing. The entire packed bag is placed within the stowage cannister, the drogue line folded on the top of bag (which may have elastic stowage loops) and the spring drogue compressed on top to be covered and restrained by the cannister cover flap, this containing a suitable release device. Upon release of the cannister cover, the drogue springs away from the payload. Aerodynamic forces inflate the drogue and withdraw the packed assembly similar to mortar deployment.

For canopy first deployment bridle straps are folded down into the bag, followed by suspension lines, and canopy. The bag is closed with bag cutter attached. Drogue line and drogue are packed on the end of the bag and secured with a suitable release mechanism or the drogue may be packed in a separate drogue gun. Another alternative is to pack the drogue line (omitting cutter) and drogue on the canopy apex within the bag and actuate the bag cutter externally. Upon release or ejection the drogue is cast into the airstream dragging forth the canopy, suspension lines, and bridle. Aerodynamic forces now inflate the canopy.

The bag may be divided into multiple compartments by the use of flaps similar to the end closures 11 and attached to the external shell of the bag at the points of peripheral bands 20. Suspension line No. 1 on the parachute assembly is provided with cutters (spaced from apex to riser straps) placed in such manner as to open each compartment in succession as required for smooth linear deployment. Such compartment dividers may be provided with elastic band restraints for the suspension line storage. Alternate restraints include fabric straps (in place of full compartmentation) with the tie string and cutters, and in some applications fabric flaps with elastic loop line restraints. Each of these arrangements shows useful application depending upon conditions relating to the deployment method and may be used jointly, singly, or omitted depending upon the requirements necessary to successful deployment of the parachute assembly.

What is claimed as new and desired to be secured by Letters Patent of the United States is:

1. In a parachute deployment bag comprising a top wall portion closing the top end of said bag, a bottom wall portion closing the bottom end of said bag, and a side wall portion extending between said top wall portion and said bottom wall portion, the improvement wherein said side wall portion comprises a foraminous outer wall and an inner wall, said inner wall being made up of a plurality of segments, each segment having an upper end disposed towards said top end of said bag and a lower end disposed towards said bottom end of said bag and having a low friction inner surface and being secured at one end only to said outer wall whereby, on removal of a parachute canopy from the bottom end of said bag, segments of said inner wall above the removed canopy flex to admit ambient atmosphere through said foraminous outer wall to facilitate removal of said parachute canopy, the free end of each segment overlapping the secured end of each adjacent segment.

2. An improved parachute deployment bag according to claim 1 wherein said low friction surface comprises a synthetic resin.

3. An improved parachute deployment bag according to claim 2 wherein said synthetic resin comprises Teflon.

4. An improved parachute deployment bag according to claim 1 further including a parachute canopy stored within the bag, and means for opening an end of said bag on deployment thereof for removal of said parachute canopy through the opened end thereof.

5. An improved parachute deployment bag according to claim 4 wherein the free end of said segments is disposed towards the end of said bag which is opened for removal of said canopy.

6. An improved parachute deployment bag according to claim 4 wherein the free end of said segments is disposed towards the end of said bag which is remote from the end of said bag which is opened for removal of said canopy.

7. An improved parachute deployment bag according to claim 1 wherein said top and bottom end wall portions are circular and said side wall portion is cylindrical.

8. An improved parachute deployment bag according to claim 7 wherein the outer wall of said side wall portion of said bag comprises a textile fabric.

9. An improved parachute deployment bag according to claim 1 wherein said bag includes reinforcing means for retaining the shape of said bag.

10. An improved parachute deployment bag according to claim 9 wherein said reinforcing means comprises a plurality of circular strenghtening members extending around and secured to said cylindrical side wall portion.

11. An improved parachute deployment bag according to claim 9 wherein said reinforcing means comprises a plurality of elongate strenghtening members extending axially of and secured to said cylindrical side wall portion.

* * * * *